(12) United States Patent
Agarwala et al.

(10) Patent No.: US 11,599,412 B1
(45) Date of Patent: Mar. 7, 2023

(54) METHOD AND APPARATUS FOR DISTRIBUTED ERASURE ENCODING

(71) Applicant: Cisco Technology, Inc., San Jose, CA (US)

(72) Inventors: Sandip Agarwala, Cupertino, CA (US); Shravan Gaonkar, Gainesville, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/475,522

(22) Filed: Sep. 15, 2021

(51) Int. Cl.
  *G06F 11/10* (2006.01)
  *G06F 3/06* (2006.01)

(52) U.S. Cl.
  CPC ........ *G06F 11/1004* (2013.01); *G06F 3/0619* (2013.01); *G06F 3/0641* (2013.01); *G06F 3/0665* (2013.01); *G06F 3/0689* (2013.01)

(58) Field of Classification Search
  None
  See application file for complete search history.

(56) References Cited

U.S. PATENT DOCUMENTS

| | | | |
|---|---|---|---|
| 2011/0225453 A1 | 9/2011 | Spry et al. | |
| 2011/0314218 A1* | 12/2011 | Bert | G06F 11/108 711/E12.019 |
| 2015/0012699 A1* | 1/2015 | Rizzo | G06F 12/0815 711/113 |
| 2015/0135006 A1* | 5/2015 | Samanta | G06F 11/2064 714/6.24 |
| 2015/0248402 A1 | 9/2015 | Patterson, III et al. | |
| 2017/0257119 A1 | 9/2017 | Wideman et al. | |
| 2019/0356416 A1 | 11/2019 | Yanovsky et al. | |

FOREIGN PATENT DOCUMENTS

WO  2018231350  12/2018

OTHER PUBLICATIONS

Minoru Uehara, Design and implementation of MeshRAID with multiple parities in Virtual large-scale disks, IEEE 26th International Conference on Advanced information networking and applications, pp. 67-72. (Year: 2012).*

Zeng et al., A high reliable and performance data distribution strategy: A RAID-5 case study, IEEE Ninth international Conference on Computational Intelligence and security, pp. 318 to 323. (Year: 2013).*

* cited by examiner

*Primary Examiner* — Shelly A Chase
(74) *Attorney, Agent, or Firm* — Polsinelli (57) ABSTRACT

Systems, methods, and computer-readable media are provided for utilizing distributed erasure encoding in a redundant array of independent disks (RAID) system. An example method can include generating a plurality of virtual redundant array of independent disk (vRAID) stripes, each of the plurality of vRAID stripes including a segment having a plurality of data, each of the plurality of data including metadata, the metadata including a checksum of a corresponding data of the plurality of data, distributing the segment of each of the plurality of vRAID stripes over a plurality of virtual nodes, mapping at least one of logical files, volumes, or objects to the plurality of data chunks and the at least one parity chunk of the plurality of vRAID stripes to avoid write-hole issues, and verifying data integrity of the corresponding data of the plurality of data using the checksum of the corresponding data.

20 Claims, 7 Drawing Sheets

METHOD AND APPARATUS FOR DISTRIBUTED ERASURE ENCODING

TECHNICAL FIELD

The present technology relates to data storage and backup systems, and more particularly to data storage and backup systems that can utilize erasure encoding.

BACKGROUND

Erasure coding (EC) is a method of transforming data (e.g., with k bits) with redundant information (e.g., with n-k bits) such that original data can be recovered from a subset of n bits. This method is commonly used for protecting data against one or more transmission or storage device failures. Erasure encoding is more space-efficient compared to other data protection schemes such as redundant array of independent disks 1 ("RAID1"), where data is simply mirrored across different storage devices. There are four common issues when implementing erasure encoding for data storage protection: 1) write-hole problems occur when an erasure-encoded stripe is partially written in an event of a power failure, e.g., rebuild of a subsequent disk failure may generate incorrect data; 2) negates the benefits of other space efficiency mechanisms such as compression, which generates variable length data that results in partial stripe writes; 3) poor partial write performance because of read-modify-write; and 4) rebuild performance.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems, methods, and computer-readable media are provided for utilizing distributed erasure encoding in a redundant array of independent disks (RAID) system. An example method can include generating a plurality of virtual redundant array of independent disk (vRAID) stripes, each of the plurality of vRAID stripes including a segment having a plurality of data, each of the plurality of data including metadata, the metadata including a checksum of a corresponding data of the plurality of data, distributing the segment of each of the plurality of vRAID stripes over a plurality of virtual nodes, the plurality of virtual nodes including a plurality of data chunks and at least one parity chunk, mapping at least one of logical files, volumes, or objects to the plurality of data chunks and the at least one parity chunk of the plurality of vRAID stripes to avoid write-hole issues, and verifying data integrity of the corresponding data of the plurality of data using the checksum of the corresponding data.

An example system can include one or more processors; and at least one computer-readable storage medium having stored therein instructions which, when executed by the one or more processors, cause the system to: generate a plurality of virtual redundant array of independent disk (vRAID) stripes, each of the plurality of vRAID stripes including a segment having a plurality of data, each of the plurality of data including metadata, the metadata including a checksum of a corresponding data of the plurality of data, distribute the segment of each of the plurality of vRAID stripes over a plurality of virtual nodes, the plurality of virtual nodes including a plurality of data chunks and at least one parity chunk, map at least one of logical files, volumes, or objects to the plurality of data chunks and the at least one parity chunk of the plurality of vRAID stripes to avoid write-hole issues, and verify data integrity of the corresponding data of the plurality of data using the checksum of the corresponding data.

An example non-transitory computer-readable storage medium having stored therein instructions which, when executed by one or more processors, cause the one or more processors to: generate a plurality of virtual redundant array of independent disk (vRAID) stripes, each of the plurality of vRAID stripes including a segment having a plurality of data, each of the plurality of data including metadata, the metadata including a checksum of a corresponding data of the plurality of data, distribute the segment of each of the plurality of vRAID stripes over a plurality of virtual nodes, the plurality of virtual nodes including a plurality of data chunks and at least one parity chunk, map at least one of logical files, volumes, or objects to the plurality of data chunks and the at least one parity chunk of the plurality of vRAID stripes to avoid write-hole issues, and verify data integrity of the corresponding data of the plurality of data using the checksum of the corresponding data.

Example Embodiments

Figure 1:
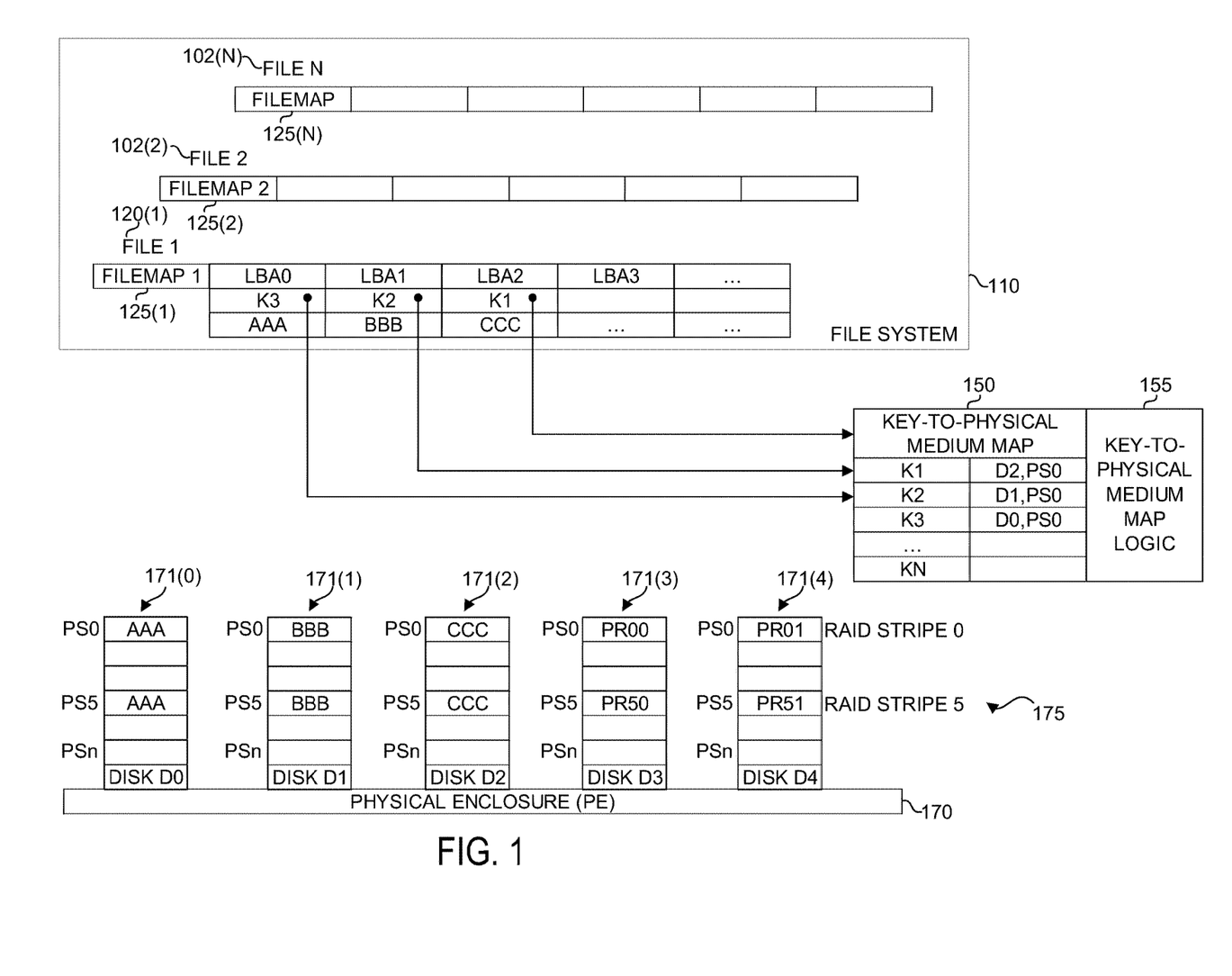
FIG. 1 illustrates an example an array of disks that provides erasure coded data storage for a file system, in accordance with an embodiment of the present disclosure.

FIG. 1 illustrates an example of an array of disks that provides erasure coded data storage for a file system, in accordance with an embodiment of the present disclosure. In particular, FIG. 1 illustrates a file system 110 that includes a plurality of files 120(1), 120(2), 120(N), each including a respective file map 125(1), 125(2), 125(N). Each of the file maps, e.g., file map 125(1), includes a series of logical block addresses (LBAs) that correspond to data that is stored on a storage medium 175. In this case, the individual blocks of data are "AAA", "BBB" and "CCC" corresponding to, or pointed to by, LBA0, LBA1, and LBA2, respectively.

The storage medium 175 may be, e.g., one or more disk drives 171(0), 171(1), 171(2), 171(3), 171(4) in an enclosure 170. That is, each LBA in a given file map, e.g., file map 125(1), can be associated with a physical sector (PS) on a given disk. For example, LBA0 in file map 125(1) corresponds to data "AAA", which is stored at physical sector 0 (PS0) of disk 171(0). LBA1 in file map 125(1) corresponds to data "BBB", which is stored at physical sector 0 (PS0) of disk 171(1). LBA2 in file map 125(1) corresponds to data "CCC", which is stored at physical sector 0 (PS0) on disk 171(2).

In accordance with embodiments described herein, the storage medium 175 may be configured as a redundant array of disk (RAID) system implementing an erasure coding scheme for data recovery in the event a given disk drive in the RAID system becomes unavailable. All of the disks may be housed in a single enclosure 170. Thus, as shown in FIG. 1, not only are physical sectors 0 on disks 171(0), 171(1), 171(2) configured to store data "AAA," "BBB" and "CCC," respectively, but physical sectors 0 of disks 171(3), 171(4) can be further configured to store parity data PRO0, PRO1, respectively, that enable the erasure coding scheme to, in the case shown with five disks, to lose any two disks and still recover any data in a given stripe of data (i.e., RAID stripe 0, the data stored across physical sectors 0 of all the disks).

In order for, e.g., the file map 125(1) to access data corresponding to any one of its LBAs, a disk and physical sector number may be needed. In a typical file system, the file map itself stores the relevant disk and physical sector number to locate the desired data in the storage medium. However, in a RAID system that implements erasure coding, the file system 110 could be subjected to a significant number of updates. For example, consider an event that would cause RAID stripe 0 to be moved to e.g., RAID stripe 5 in FIG. 1. As will be appreciated by those skilled in the art, all of the physical sector numbers (PS0s) that would be stored in a given file map, would then have to be changed, in this case, to PS5's for each of LBA0, LBA1, and LBA2. Such file system updating can quickly become burdensome to the file system 110 and bog down the overall efficiency of a related computing system as described herein. That is, storage medium 175, configured as a RAID system, can cause file system 110 to have to update itself as a result of changes occurring in the storage medium 175, but that are unrelated to the file system 110. This can unduly burden the file system 110.

In some implementations, the file system can include providing an intermediary mapping scheme that can be logically disposed between the file system 110 and the storage medium 175 and that takes care of monitoring and adapting to changes occurring in the storage medium 175. Specifically, a key-to-physical medium map 150 can be arranged as a key-value index. The "key" component of the key-value index is unique and may be generated via a monotonically increasing sequence. The "value" component of the key-value index may be the disk number and physical sector of where given data is stored in the storage medium 175. For example, and still referring to FIG. 1, key K1 is associated with D2 (171(2)) and PS0, which correspond to data "CCC". As such, K1 is stored in association with LBA2 in file map 125(1). Similarly, K2 is associated with D1 (171(1)) and PS0, which correspond to data "BBB". As such, K2 is stored in association with LBA1 in file map 125(1). Likewise, K3 is associated with D0 (171(0)) and PS0, which correspond to data "AAA". As such, K3 is stored in association with LBA0 in file map 125(1).

In an embodiment, key-to-physical medium map logic 155 is provided in connection with key-to-physical medium map 150 and is configured to, among other things, generate the keys (e.g., monotonically, or via a unique fingerprint based on the data being stored), provide respective keys to file system 110 when file system requests a data write, and act as an intermediary between the file system 110 and storage medium 175 when the file system 110 makes a read request for data stored in the storage medium 175.

Thus, as shown in FIG. 1, there is provided an array of physical storage devices configured to store segments of data in a striping fashion across the array, and a key-to-physical medium map configured to associate a key to (i) a given storage device in the array of physical storage devices and (ii) a given physical sector on the given storage device. Key-to-physical medium map logic 155 is configured to generate the key, supply the key to a file map of a file system and act as an intermediary between the file system and the storage medium in connection with data read requests and data write requests based on the key.

With a system configured as shown in FIG. 1, the key-to-physical medium map 150 may need to be updated when, e.g., a RAID stripe is moved in the storage medium. That is, the keys themselves would not change, and as such, no changes are needed in the file maps 120(1), 120(2), 120(N) of the file system 110. Instead, the "value" pointed to by the keys (i.e., disk number and physical sector) configured as the key-to-physical storage medium map 150 would change, thus enabling the file system to still access the correct data despite a RAID stripe move.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122 and an analytics engine 124. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Erasure coding (EC) is a method of transforming data (e.g., with k bits) with redundant information (e.g., with n-k bits) such that original data can be recovered from a subset of n bits. This method is commonly used for protecting data against one or more transmission or storage device failures. Erasure encoding is more space-efficient compared to other data protection schemes such as redundant array of independent disks 1 ("RAID1"), where data is simply mirrored across different storage devices. There are four common issues when implementing erasure encoding for data storage protection: 1) write-hole problems occur when an erasure-encoded stripe is partially written in an event of a power failure, e.g., rebuild of a subsequent disk failure may generate incorrect data; 2) negates the benefits of other space efficiency mechanisms such as compression, which generates variable length data that results in partial stripe writes; 3) poor partial write performance because of read-modify-write; and 4) rebuild performance.

The present disclose addresses the above-mentioned deficiencies by utilizing a virtual redundant array of independent disks ("vRAID") that can implement erasure encoding for a distributed scale out storage systems that may further utilize a distributed log structured file system that avoids the above-mentioned issues. For example, advantages of the present disclosure include: 1) scale-out distributed erasure encoding that can protect against multiple disk and server failures by utilizing a distributed log structured file system; 2) minimal to no read-modify-write performance problems as new writes are appended to a vRAID log; 3) avoid write-hole problems by maintaining a FileTree that maps logical files to vRAID stripe locations, including updating the FileTree Map for complete stripe writes; 4) preserve the efficiency of compression by "tightly" packing compressed data and metadata objects to compose complete RAID stripes that may be written to the storage devices; 5) use checksums to verify data integrity as opposed to reading the full stripe and checking parity information, thereby increasing efficiencies of the system; and 6) fast and parallel rebuilds may be possible by generating smaller vRAID chunks that may be distributed across an entire cluster.

Figure 2:
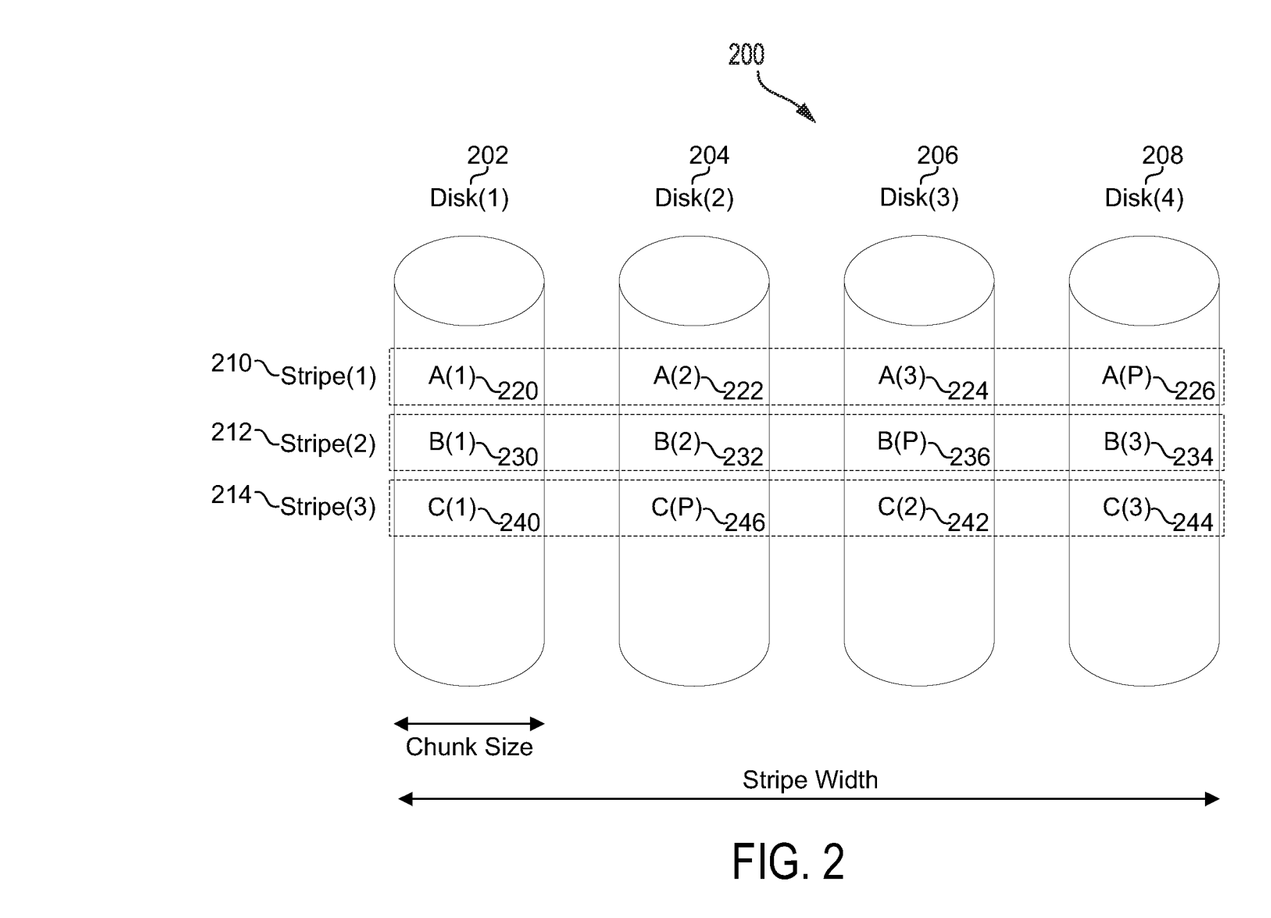
FIG. 2 illustrates an example RAID system utilizing physical disks, in accordance with an embodiment of the present disclosure.

FIG. 2 illustrates an example RAID system utilizing physical disks 200, in accordance with an embodiment of the present disclosure. In some implementations, the RAID system 200 can include a logical or physical disk (1) 202, disk (2) 204, disk (3) 206, and disk (4) 208 that can utilize stripe (1) 210, stripe (2) 212, and stripe (3) 214. A stripe can include data that is divided across a set of hard disks or solid-state drives (SSDs) (e.g., stripe width), and a striped unit can refer to a data slice of the stripe on an individual drive (e.g., chunk size). For example, stripe (1) 210 can include striped units A(1) 220, A(2) 222, A(3)224, and A(P) 226. Stripe (2) 212 can include striped units B(1) 230, B(2) 232, B(3) 234, and B(P) 236. Stripe (3) 214 can include striped units C(1) 240, C(2) 242, C(3) 244, and C(P) 246.

Redundant Array of Independent Disks (RAID) is part of a class of "optimal" erasure codes where the number of bits required to recover transformed data is same as the original data. Various types of RAID include RAID0 (e.g., that can utilize striping), RAID1 (e.g., that can utilize mirroring), RAID5 (e.g., that can utilize striping and parity), etc. FIG. 2 illustrates an example RAID5 3+1 configuration 200, where three data "chunks" (e.g., striped unit/chunk A(1) 220, A(2) 222, and A(3) 224) are padded with one parity chunk (e.g., striped unit/chunk A(P)) to compose a RAID5 stripe (e.g., stripe (1) 210). These four chunks are then stored in four separate physical storage devices (e.g., disk (1) 202, disk (2) 204, disk (3) 206, and disk (4) 208) that are in different failure domains. "Read" can be serviced from the corresponding data chunks of each stripe (e.g., stripe (1) 210, stripe (2) 212, and stripe (3)214). In the event of a failure of a drive (e.g., physical storage devices (e.g., disk (1) 202, disk (2) 204, disk (3) 206, and disk (4) 208) with the data chunk (e.g., chunks A(1) 220, A(2) 222, and A(3) 224), the parity chunk (e.g., A(P) 226) along with other data chunks in the stripe (e.g., stripe (1) 210) need to be read to reconstruct the lost data chunk.

As mentioned earlier, a traditional RAID storage system would suffer from read-modify-write due to partial stripe writes and/or write hole problems from drive errors, power failures, read/write errors, etc.

Figure 3:
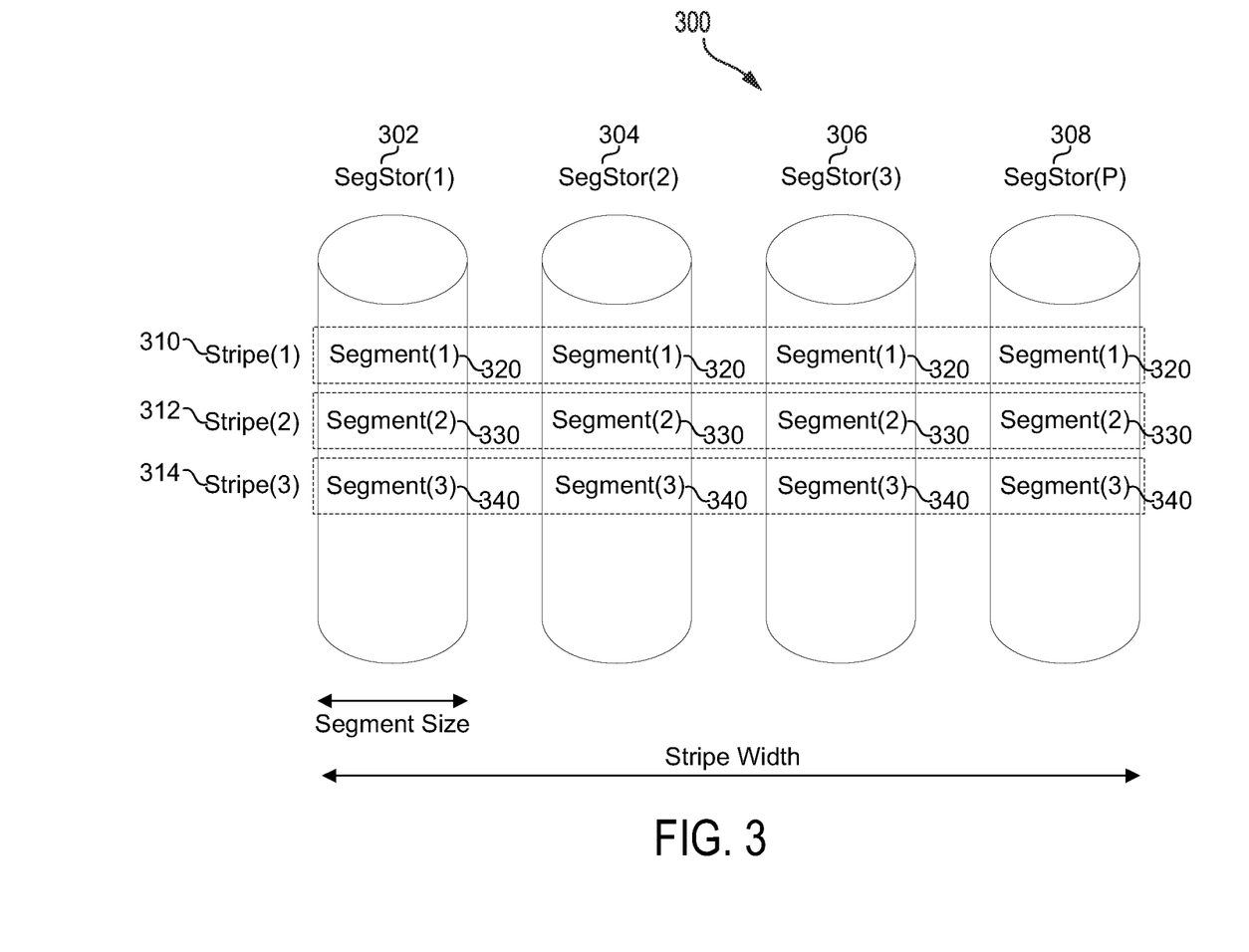
FIG. 3 illustrates an example RAID system utilizing Segment Stors, in accordance with an embodiment of the present disclosure.

FIG. 3 illustrates an example RAID system utilizing Log Structured Segment Stors 300, in accordance with an embodiment of the present disclosure. In some implementations, the RAID system 300 can include SegStor (1) 302, SegStor (2) 304, SegStor (3) 306, and SegStor (P) 308 that can utilize stripe (1) 310, stripe (2) 312, and stripe (3) 314. A stripe can include data that is distributed across a set of SegStors (e.g., stripe width), and a segment can refer to a data slice of the stripe on an individual SegStor. For example, stripe (1) 310 can include Segment (1) 320 distributed amongst SegStor (1) 302, SegStor (2) 304, SegStor (3) 306, and SegStor (P) 308. Stripe (2) 312 can include SegStor (2)330 distributed amongst SegStor (1) 302, SegStor (2) 304, SegStor (3) 306, and SegStor (P) 308. Stripe (3) 314 can include SegStor (3) distributed amongst SegStor (1) 302, SegStor (2)304, SegStor (3) 306, and SegStor (P) 308.

In some implementations, the RAID system 300 can be a virtual RAID ("vRAID") system that can utilize a log-structured file system to avoid issues as described herein. In some examples, the RAID system 300 can be described in the context of a distributed scale out hyper-converged system, which can also be utilized for centralized storage and other forms of distributed storage systems. In other examples, the RAID system 300 can also implement erasure encoding for a distributed scale out hyper-converged system utilizing a distributed log structured file system. The RAID system 300 can further provide better performance and space efficiency, while limiting any requirement of special hardware (e.g., nonvolatile random-access memory ("NVRAM")) support.

In other implementations, instead of utilizing a whole physical drive to compose a RAID group, a physical drive can be partitioned into multiple virtual storage containers referred to as a "SegmentStor/s" or "SegStor/s" (e.g., SegStor (1) 302, SegStor (2) 304, SegStor (3) 306, and SegStor (P) 308). By utilizing partitioned virtual storage containers (e.g., SegStor (1) 302, SegStor (2) 304, SegStor (3) 306, and SegStor (P) 308), the RAID system 300 can allow for a more flexible allocation of space across different storage devices in a cluster (e.g., multiple storage devices or nodes each including multiple storage devices).

Each of the SegmentStors (e.g., SegStor (1) 302, SegStor (2) 304, SegStor (3)306, and SegStor (P) 308) can implement a log utilizing fixed size "segments" (e.g., Segment (1) 320, Segment (2) 330, and Segment (3) 340). New data or metadata object (e.g., metadata 474 of FIG. 4) writes can be appended to a segment (e.g., Segment (1) 320, Segment (2) 330, and Segment (3) 340) that may be at a head of (e.g., at a beginning of) a corresponding SegmentStor log. In some examples, when the segment head is written fully, a new segment can be allocated and added to the head of a corresponding SegmentStor log.

In some implementations, the RAID system 300 can be a distributed RAID5 system and be constructed out of three or more SegmentStor logs from physical drives in different failure domains (e.g., a vRAID group). For example, the distributed RAID5 system can be a 3+1 RAID5 including three data chunks and one parity chunk, thereby allocating four SegmentStors.

TABLE 1

| $<O_1, O_2, \ldots O_N>$ | $<k_1, k_2, \ldots k_N>$ |
| --- | --- |

Table 1 illustrates an example structure of a segment (e.g., Segment (1) 320, Segment (2) 330, and Segment (3) 340) as described herein, where object contents can be packed together one after another followed by their respective "keys," which can describe a location of the object in the corresponding segment (e.g., Segment (1) 320, Segment (2) 330, and Segment (3) 340). "O" can refer to an object, and "k" can refer to metadata relating to the corresponding object.

In some implementations, logical file location (e.g., <file number, file-offset>) can be mapped to a physical object key (e.g., a virtual block address (VBA)). For example, the VBA can be of a format <vNode num, chunk number, segment num, offset>, which may a virtual node ("vNode") number, a chunk/Segstor number, a segment number, and an offset/object number, respectively. Each vNode number can be mapped to a vRAID group that may include three or more Segment Stors (e.g., SegStor (1) 302, SegStor (2) 304, SegStor (3) 306, and SegStor (P) 308). The chunk/Segstor number can identify a designated Segment Stor (e.g., SegStor (1) 302, SegStor (2) 304, SegStor (3) 306, and SegStor (P) 308) in the vRAID group/system 300. The segment number can identify the segment (e.g., Segment (1) 320, Segment (2) 330, and Segment (3) 340) in the Segment Stor (e.g., SegStor (1) 302, SegStor (2) 304, SegStor (3) 306, and SegStor (P) 308). Offset is the position in the segment where the object is stored.

Figure 4:
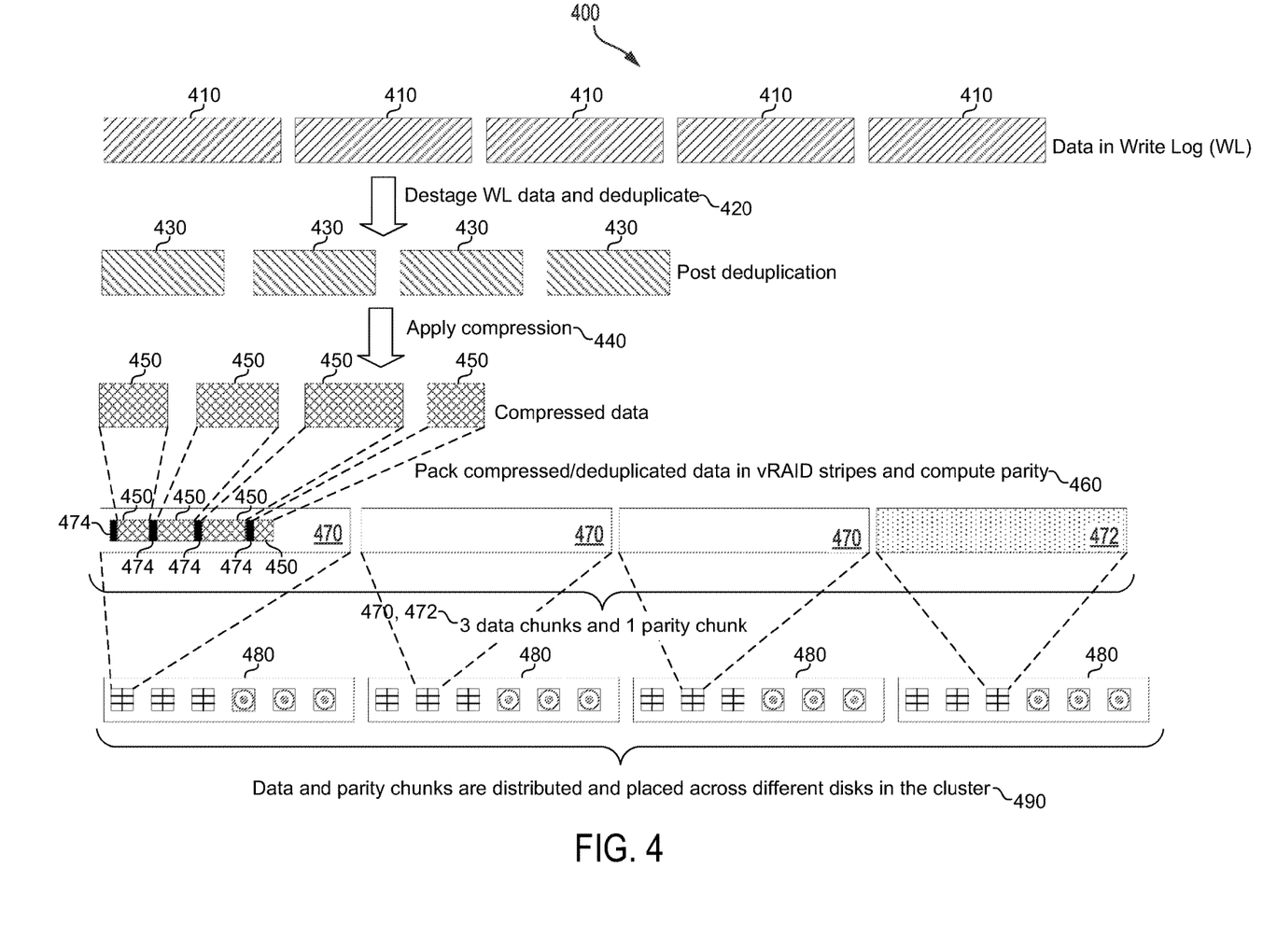
FIG. 4 illustrates an example workflow of the RAID system of FIG. 3, in accordance with an embodiment of the present disclosure.

FIG. 4 illustrates an example workflow 400 of the RAID system 300 of FIG. 3, in accordance with an embodiment of the present disclosure. In some implementations, the workflow 400 can include receiving data 410 and generating a write log (WL).

In step 420 of workflow 400, the write log data of 410 can be destaged and deduplicated to generate post deduplication data 430. The process of deduplication can ensure that only unique data blocks are stored in a capacity tier.

In step 440 of workflow 400, the post deduplication data 430 can be compressed to generate compressed data 450.

In step 460 of workflow 400, the compressed data 450 and corresponding metadata 474 of each of the compressed data 450 can be populated into respective vRAID stripes (e.g., stripe 470) and compute parities (e.g., parity 472).

In step 490 of workflow 400, the data chunks 470 and the parity chunks 472 can be distributed and populated amongst different disks 480 in a cluster as described herein.

Write Workflow:

In some implementations, new data and metadata objects (e.g., metadata 474) can be packed in a memory buffer equal to a size of a vRAID stripe (e.g., stripe (1) 310, stripe (2)312, and stripe (3) 314). Each object can include a header that may be associated with the corresponding object, which can contain a respective checksum along with other metadata. In some examples, the checksum can be a block of data derived from another block of data (e.g., an object as described herein) that may be utilized to detect errors, which may have been introduced during its transmission or storage. The checksum may also be utilized to verify data integrity.

In other implementations, when one of the stripes 470 becomes full, the object keys (e.g., VBAs) can be copied at the end of each chunk in the stripe to service future lookups for reads. The fully packed stripe 470 can also be written to newly allocated segments (e.g., Segment (1) 320, Segment (2) 330, and Segment (3) 340 of FIG. 3) in the SegmentStors (e.g., SegStor (1) 302, SegStor (2) 304, SegStor (3) 306, and SegStor (P) 308 of FIG. 3) constituting the stripe 470. In some implementations, the new writes may be performed at a head of a log-structured Segment Stor (e.g., SegStor (1) 302, SegStor (2) 304, SegStor (3) 306, and SegStor (P) 308 of FIG. 3), thereby avoiding read-modify-write issues with a vRAID system (e.g., vRAID system 300 of FIG. 3).

In some implementations, the workflow 400 can include utilizing a filetree map, as described herein. The workflow 400 may also include updating the filetree map after the complete stripe 470 is successfully written in all the SegmentStors (e.g., SegStor (1) 302, SegStor (2) 304, SegStor (3) 306, and SegStor (P) 308 of FIG. 3) of the cluster 490. This process of updating the filetree map can avoid the write-hole problem as described herein. A partially written stripe (e.g., in the event of a failure) can later be garbage collected.

Read Workflow:

In some implementations, when servicing a read for a particular region of a file, the workflow 400 can include utilizing a corresponding VBA of the file that is referenced from the filetree map. As described herein, the VBA can also be utilized to locate a vRAID group, a Segment Stor, and a segment that contains the data of the file. Data object can also be read along with its header from the segment's offset, which may be indicated in the VBA. The data can then be matched with a corresponding checksum in the header to ensure data integrity. By doing so, workflow 400 can avoid having to read the entire stripe and perform a parity check for verifying integrity.

Failure Handling:

In some implementations, if a disk fails (e.g., includes checksum errors) or goes offline, multiple Segment Stors (e.g., SegStor (1) 302, SegStor (2) 304, SegStor (3) 306, and SegStor (P) 308 of FIG. 3) in the disks may become unavailable. For the impacted vRAID groups, data read can be serviced by reading the corresponding RAID stripe (e.g., that includes both the corresponding data and parity chunks) and reconstructing the lost chunk.

RAID Rebuild:

In some implementations, if a failed disk does not become available for a period of time, a RAID rebuild may be initiated by workflow 400. For example, workflow 400 can include allocating a new SegmentStor (e.g., SegStor (1) 302, SegStor (2) 304, SegStor (3)306, and SegStor (P) 308 of FIG. 3) for each failed vRAID group in a different disk that may be located in the same node as the failed disk or a different node. The new SegmentStor (e.g., SegStor (1) 302, SegStor (2) 304, SegStor (3) 306, and SegStor (P) 308 of FIG. 3) can also be rebuilt by fetching data in parallel from all other chunks in the vRAID group. In a traditional RAID implementation with fixed mapping of RAID groups to physical disks, the active disks in the RAID group may become bottlenecked during the RAID build. However, in the present disclosure, the vRAID system (e.g., the RAID system 300), the SegmentStors (e.g., SegStor (1) 302, SegStor (2) 304, SegStor (3) 306, and SegStor (P) 308 of FIG. 3) of different vRAID groups may be distributed across an entire cluster. As such, the rebuild load can also be distributed, thereby avoiding generating a bottleneck at any single or a set of disks.

Figure 5:
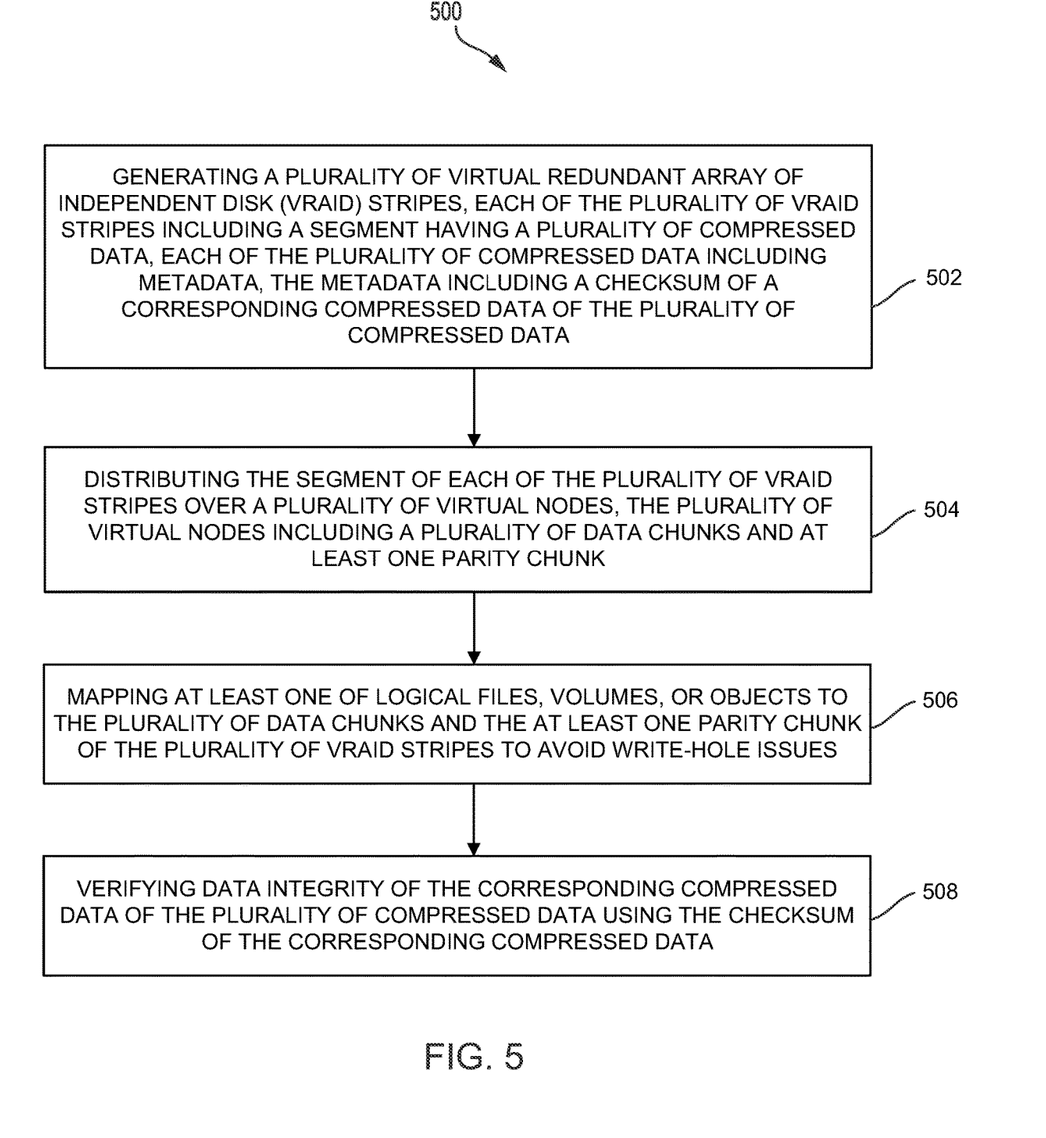
FIG. 5 illustrates an example process for utilizing erasure encoding in a RAID system, in accordance with an embodiment of the present disclosure.

FIG. 5 illustrates an example method 500 for utilizing erasure encoding in a redundant array of independent disks ("RAID") system. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

At step 502, the method 500 can include generating a plurality of virtual redundant array of independent disk (vRAID) stripes, each of the plurality of vRAID stripes including a segment having a plurality of compressed data, each of the plurality of compressed data including metadata, the metadata including a checksum of a corresponding compressed data of the plurality of compressed data. The plurality of compressed data can include uncompressed and compressed variable-sized data blocks and be generated by destaging and deduplicating compressed or uncompressed data in write log. The metadata can be positioned at a head of the corresponding compressed data of the plurality of compressed data.

At step 504, the method 500 can include distributing the segment of each of the plurality of vRAID stripes over a plurality of virtual nodes, the plurality of virtual nodes including a plurality of data chunks and at least one parity chunk. Each of the plurality of virtual nodes can be allocated to different storage devices in a cluster. Each of the plurality of data chunks and the at least one parity chunk can be partitioned into a plurality of virtual storage containers.

At step 506, the method 500 can include mapping at least one of logical files, volumes, or objects to the plurality of data chunks and the at least one parity chunk of the plurality of vRAID stripes to avoid write-hole issues. The mapping of the at least one of logical files, volumes, or objects can include maintaining a tree that maps the at least one of logical files, volumes, or objects to the plurality of data chunks and the at least one parity chunk of the plurality of vRAID stripes. Each of the logical files mapped to the tree can include a virtual block address having a virtual node number, a chunk number, a segment number, and an offset number for a corresponding logical file of the logical files.

At step 508, the method 500 can include verifying data integrity of the corresponding compressed data of the plurality of compressed data using the checksum of the corresponding compressed data.

The method 500 can further include utilizing the virtual block address of the corresponding logical file of the logical files to locate the corresponding logical file in the plurality of virtual nodes, and matching the corresponding logical file with a corresponding checksum in a header of the corresponding logical file to ensure data integrity.

Figure 6:
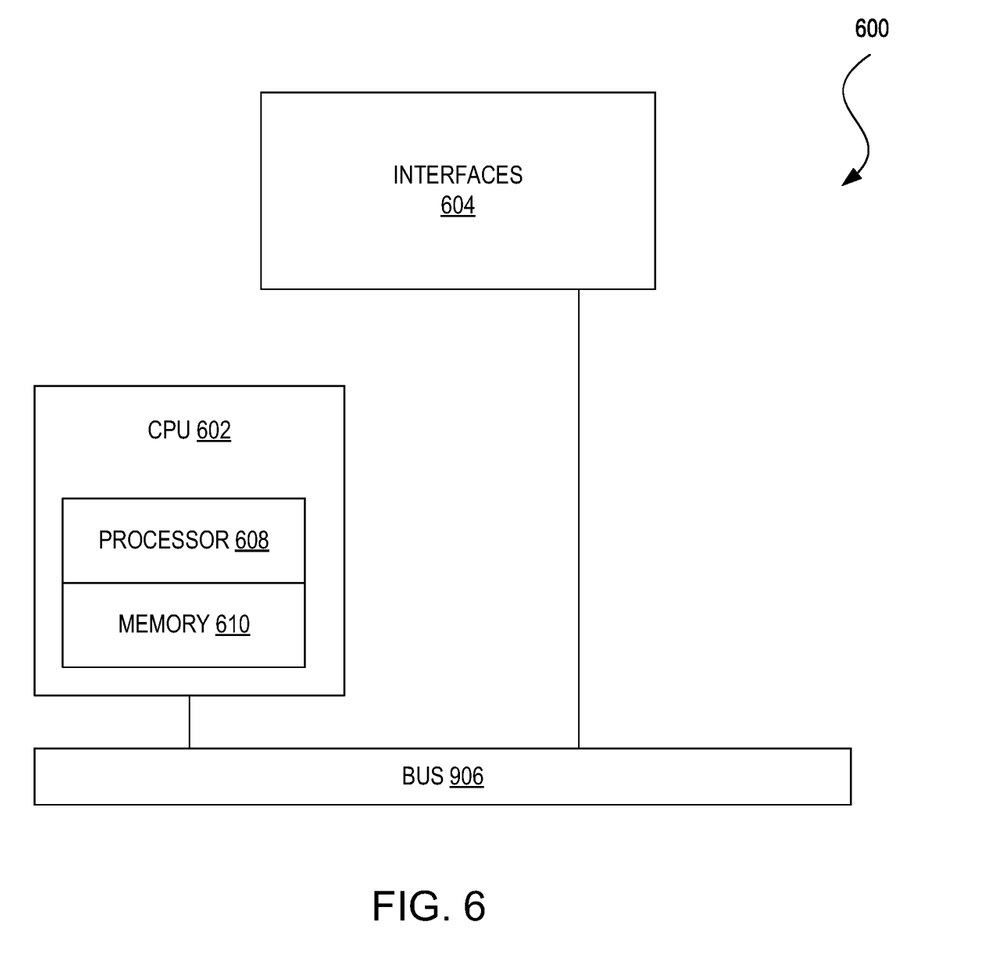
FIG. 6 illustrates an example of a network device, in accordance with some embodiments of the present disclosure.

FIG. 6 further illustrates an example of a network device 600 (e.g., switch, router, network appliance, etc.). The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

An enterprise network can address the above and other security requirements with certain enhancements. For example, the enterprise network can create an International Mobile Subscriber Identity (IMSI) whitelist in in an Authentication, Authorization, and Accounting (AAA) server. In addition to SIM authentication, the enterprise network can maintain the AAA server containing the IMSIs of enterprise-provisioned devices. After initial authentication, a Packet Data Network Gateway (PGW) can validate the IMSI with the local device. The enterprise can also create a mapping of IMSIs to International Mobile Equipment Identities (IMEIs) for (non-embedded) SIM cards. The cloud-hosted authentication system can maintain a mapping between IMSIs and IMEIs. This mapping can be controlled by the enterprise network. This can ensure a binding between device and SIM. After authentication, the mobile core can request the IMEI. It can further check if the IMEI maps to IMSI. The enterprise network can also deploy Virtual Routing and Forwarding (VRFs) instances based on device policy. The PGW can tunnel user traffic to specific VRFs.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7A:
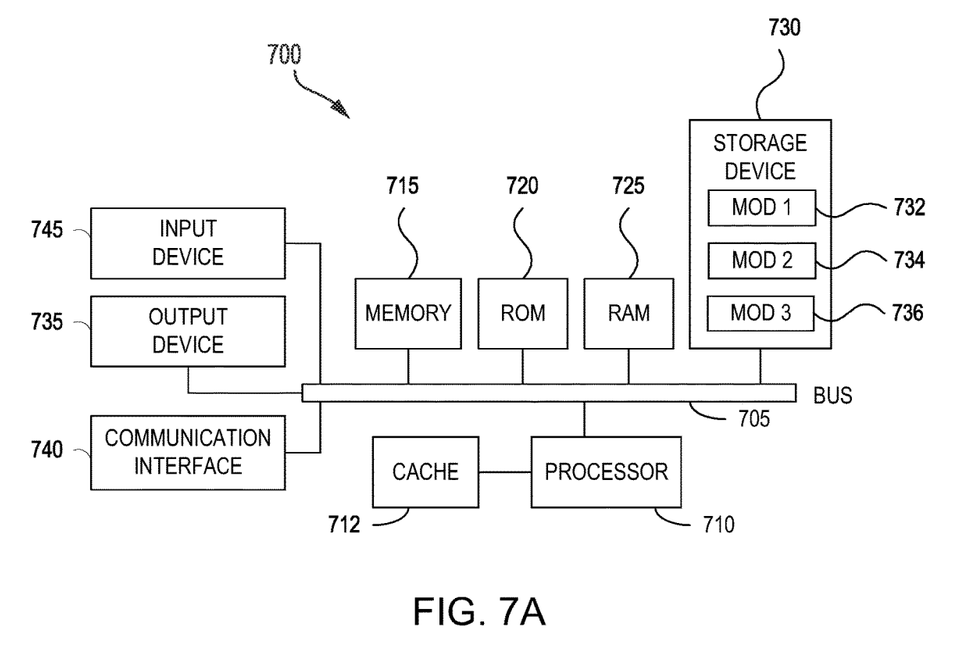
FIGS. 7A and 7B illustrate examples of systems, in accordance with some embodiments of the present disclosure.
Figure 7B:
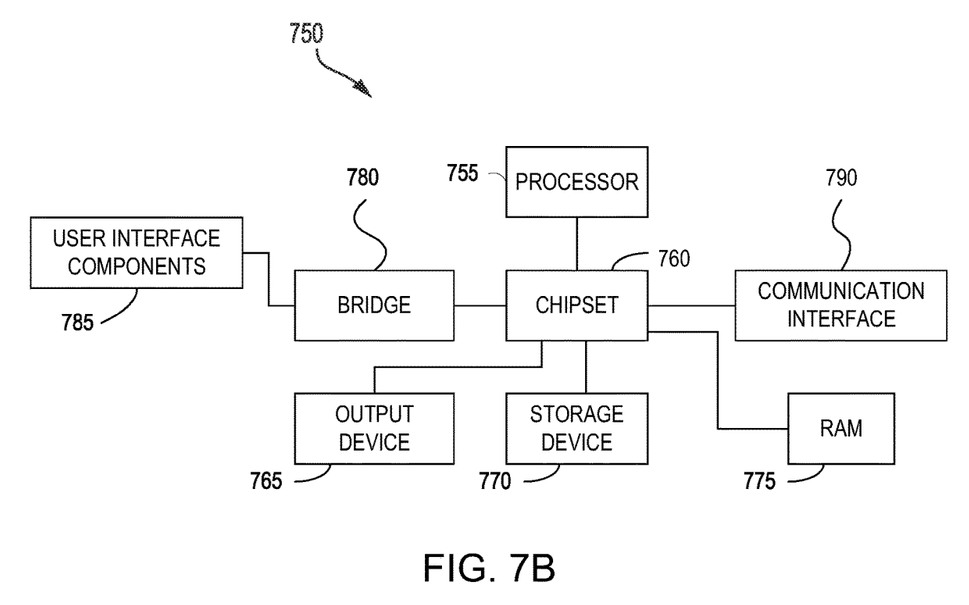

FIGS. 7A and 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1: A method comprising: generating a plurality of virtual redundant array of independent disk (vRAID) stripes, each of the plurality of vRAID stripes including a segment having a plurality of data, each of the plurality of data including metadata, the metadata including a checksum of a corresponding data of the plurality of data; distributing the segment of each of the plurality of vRAID stripes over a plurality of virtual nodes, the plurality of virtual nodes including a plurality of data chunks and at least one parity chunk; mapping at least one of logical files, volumes, or objects to the plurality of data chunks and the at least one parity chunk of the plurality of vRAID stripes to avoid write-hole issues; and verifying data integrity of the corresponding data of the plurality of data using the checksum of the corresponding data.

Aspect 2: The method of Aspect 1, wherein the plurality of data includes uncompressed and compressed variable-sized data blocks and is generated by destaging and deduplicating compressed or uncompressed data in write log.

Aspect 3: The method of any of Aspects 1 to 2, wherein each of the plurality of virtual nodes are allocated to different storage devices in a cluster.

Aspect 4: The method of any of Aspects 1 to 3, wherein each of the plurality of data chunks and the at least one parity chunk is partitioned into a plurality of virtual storage containers.

Aspect 5: The method of any of Aspects 1 to 4, wherein the mapping of the at least one of logical files, volumes, or objects includes maintaining a tree that maps the at least one of logical files, volumes, or objects to the plurality of data chunks and the at least one parity chunk of the plurality of vRAID stripes.

Aspect 6: The method of any of Aspects 1 to 5, wherein each of the logical files mapped to the tree includes a virtual block address having a virtual node number, a chunk number, a segment number, and an offset number for a corresponding logical file of the logical files.

Aspect 7: The method of any of Aspects 1 to 6, further comprising: utilizing the virtual block address of the corresponding logical file of the logical files to locate the corresponding logical file in the plurality of virtual nodes; and matching the corresponding logical file with a corresponding checksum in a header of the corresponding logical file to ensure data integrity.

Aspect 8: A system comprising: one or more processors; and at least one computer-readable storage medium having stored therein instructions which, when executed by the one or more processors, cause the system to: generate a plurality of virtual redundant array of independent disk (vRAID) stripes, each of the plurality of vRAID stripes including a segment having a plurality of data, each of the plurality of data including metadata, the metadata including a checksum of a corresponding data of the plurality of data; distribute the segment of each of the plurality of vRAID stripes over a plurality of virtual nodes, the plurality of virtual nodes including a plurality of data chunks and at least one parity chunk; map at least one of logical files, volumes, or objects to the plurality of data chunks and the at least one parity chunk of the plurality of vRAID stripes to avoid write-hole issues; and verify data integrity of the corresponding data of the plurality of data using the checksum of the corresponding data.

Aspect 9: The system of Aspect 8, wherein the plurality of data includes uncompressed and compressed variable-sized data blocks and is generated by destaging and deduplicating compressed or uncompressed data in write log.

Aspect 10: The system of any of Aspects 8 to 9, wherein each of the plurality of virtual nodes are allocated to different storage devices in a cluster.

Aspect 11: The system of any of Aspects 8 to 10, wherein each of the plurality of data chunks and the at least one parity chunk is partitioned into a plurality of virtual storage containers.

Aspect 12: The system of any of Aspects 8 to 11, wherein the map of the at least one of logical files, volumes, or objects includes maintaining a tree that maps the at least one of logical files, volumes, or objects to the plurality of data chunks and the at least one parity chunk of the plurality of vRAID stripes.

Aspect 13: The system of any of Aspects 8 to 12, wherein each of the logical files mapped to the tree includes a virtual block address having a virtual node number, a chunk number, a segment number, and an offset number for a corresponding logical file of the logical files.

Aspect 14: The system of any of Aspects 8 to 13, wherein the instructions which, when executed by the one or more processors, cause the system to: utilize the virtual block address of the corresponding logical file of the logical files to locate the corresponding logical file in the plurality of virtual nodes; and match the corresponding logical file with a corresponding checksum in a header of the corresponding logical file to ensure data integrity.

Aspect 15: A non-transitory computer-readable storage medium comprising: instructions stored on the non-transitory computer-readable storage medium, the instructions, when executed by one or more processors, cause the one or more processors to: generate a plurality of virtual redundant array of independent disk (vRAID) stripes, each of the plurality of vRAID stripes including a segment having a plurality of data, each of the plurality of data including metadata, the metadata including a checksum of a corresponding data of the plurality of data; distribute the segment of each of the plurality of vRAID stripes over a plurality of virtual nodes, the plurality of virtual nodes including a plurality of data chunks and at least one parity chunk; map at least one of logical files, volumes, or objects to the plurality of data chunks and the at least one parity chunk of the plurality of vRAID stripes to avoid write-hole issues; and verify data integrity of the corresponding data of the plurality of data using the checksum of the corresponding data.

Aspect 16: The computer readable medium of Aspect 15, wherein each of the plurality of virtual nodes are allocated to different storage devices in a cluster.

Aspect 17: The computer readable medium of any of Aspects 15 to 16, wherein each of the plurality of data chunks and the at least one parity chunk is partitioned into a plurality of virtual storage containers.

Aspect 18: The computer readable medium of any of Aspects 15 to 17, wherein the map of the at least one of logical files, volumes, or objects includes maintaining a tree that maps the at least one of logical files, volumes, or objects to the plurality of data chunks and the at least one parity chunk of the plurality of vRAID stripes.

Aspect 19: The computer readable medium of any of Aspects 15 to 18, wherein each of the logical files mapped to the tree includes a virtual block address having a virtual node number, a chunk number, a segment number, and an offset number for a corresponding logical file of the logical files.

Aspect 20: The computer readable medium of any of Aspects 15 to 19, wherein the instructions, when executed by the one or more processors, cause the one or more processors to: utilize the virtual block address of the corresponding logical file of the logical files to locate the corresponding logical file in the plurality of virtual nodes; and match the corresponding logical file with a corresponding checksum in a header of the corresponding logical file to ensure data integrity.

What is claimed is:
1. A method comprising:
generating a plurality of virtual redundant array of independent disk (vRAID) stripes, each of the plurality of vRAID stripes including a segment having a plurality of data, each of the plurality of data including metadata, the metadata including a checksum of a corresponding data of the plurality of data;
distributing the segment of each of the plurality of vRAID stripes over a plurality of virtual nodes, the plurality of virtual nodes including a plurality of data chunks and at least one parity chunk;
mapping at least one of logical files, volumes, or objects to the plurality of data chunks and the at least one parity chunk of the plurality of vRAID stripes to avoid write-hole issues; and
verifying data integrity of the corresponding data of the plurality of data using the checksum of the corresponding data.

2. The method of claim 1, wherein the plurality of data includes uncompressed and compressed variable-sized data blocks and is generated by destaging and deduplicating compressed or uncompressed data in write log.

3. The method of claim 1, wherein each of the plurality of virtual nodes are allocated to different storage devices in a cluster.

4. The method of claim 1, wherein each of the plurality of data chunks and the at least one parity chunk is partitioned into a plurality of virtual storage containers.

5. The method of claim 1, wherein the mapping of the at least one of logical files, volumes, or objects includes maintaining a tree that maps the at least one of logical files, volumes, or objects to the plurality of data chunks and the at least one parity chunk of the plurality of vRAID stripes.

6. The method of claim 5, wherein each of the logical files mapped to the tree includes a virtual block address having a virtual node number, a chunk number, a segment number, and an offset number for a corresponding logical file of the logical files.

7. The method of claim 6, further comprising:
utilizing the virtual block address of the corresponding logical file of the logical files to locate the corresponding logical file in the plurality of virtual nodes; and
matching the corresponding logical file with a corresponding checksum in a header of the corresponding logical file to ensure data integrity.

8. A system comprising:
one or more processors; and
at least one computer-readable storage medium having stored therein instructions which, when executed by the one or more processors, cause the system to:
generate a plurality of virtual redundant array of independent disk (vRAID) stripes, each of the plurality of vRAID stripes including a segment having a plurality of data, each of the plurality of data including metadata, the metadata including a checksum of a corresponding data of the plurality of data;
distribute the segment of each of the plurality of vRAID stripes over a plurality of virtual nodes, the plurality of virtual nodes including a plurality of data chunks and at least one parity chunk;
map at least one of logical files, volumes, or objects to the plurality of data chunks and the at least one parity chunk of the plurality of vRAID stripes to avoid write-hole issues; and
verify data integrity of the corresponding data of the plurality of data using the checksum of the corresponding data.

9. The system of claim 8, wherein the plurality of data includes uncompressed and compressed variable-sized data blocks and is generated by destaging and deduplicating compressed or uncompressed data in write log.

10. The system of claim 8, wherein each of the plurality of virtual nodes are allocated to different storage devices in a cluster.

11. The system of claim 8, wherein each of the plurality of data chunks and the at least one parity chunk is partitioned into a plurality of virtual storage containers.

12. The system of claim 8, wherein the map of the at least one of logical files, volumes, or objects includes maintaining a tree that maps the at least one of logical files, volumes, or objects to the plurality of data chunks and the at least one parity chunk of the plurality of vRAID stripes.

13. The system of claim 12, wherein each of the logical files mapped to the tree includes a virtual block address having a virtual node number, a chunk number, a segment number, and an offset number for a corresponding logical file of the logical files.

14. The system of claim 13, wherein the instructions which, when executed by the one or more processors, cause the system to:
utilize the virtual block address of the corresponding logical file of the logical files to locate the corresponding logical file in the plurality of virtual nodes; and
match the corresponding logical file with a corresponding checksum in a header of the corresponding logical file to ensure data integrity.

15. A non-transitory computer-readable storage medium comprising:
instructions stored on the non-transitory computer-readable storage medium, the instructions, when executed by one or more processors, cause the one or more processors to:
generate a plurality of virtual redundant array of independent disk (vRAID) stripes, each of the plurality of vRAID stripes including a segment having a plurality of data, each of the plurality of data including metadata, the metadata including a checksum of a corresponding data of the plurality of data;
distribute the segment of each of the plurality of vRAID stripes over a plurality of virtual nodes, the plurality of virtual nodes including a plurality of data chunks and at least one parity chunk;
map at least one of logical files, volumes, or objects to the plurality of data chunks and the at least one parity chunk of the plurality of vRAID stripes to avoid write-hole issues; and
verify data integrity of the corresponding data of the plurality of data using the checksum of the corresponding data.

16. The non-transitory computer-readable storage medium of claim 15, wherein each of the plurality of virtual nodes are allocated to different storage devices in a cluster.

17. The non-transitory computer-readable storage medium of claim 15, wherein each of the plurality of data chunks and the at least one parity chunk is partitioned into a plurality of virtual storage containers.

18. The non-transitory computer-readable storage medium of claim 15, wherein the map of the at least one of logical files, volumes, or objects includes maintaining a tree that maps the at least one of logical files, volumes, or objects to the plurality of data chunks and the at least one parity chunk of the plurality of vRAID stripes.

19. The non-transitory computer-readable storage medium of claim 18, wherein each of the logical files mapped to the tree includes a virtual block address having a virtual node number, a chunk number, a segment number, and an offset number for a corresponding logical file of the logical files.

20. The non-transitory computer-readable storage medium of claim 19, wherein the instructions, when executed by the one or more processors, cause the one or more processors to:
  utilize the virtual block address of the corresponding logical file of the logical files to locate the corresponding logical file in the plurality of virtual nodes; and
  match the corresponding logical file with a corresponding checksum in a header of the corresponding logical file to ensure data integrity.

* * * * *